United States Patent
Zhang et al.

(10) Patent No.: US 10,906,836 B1
(45) Date of Patent: Feb. 2, 2021

(54) COMPOSITE PLATE AND PREPARATION METHOD THEREOF

(71) Applicant: FOSHAN YIXIN STONE CO., LTD, Guangdong (CN)

(72) Inventors: Guoming Zhang, Guangdong (CN); Jiansong Xian, Guangdong (CN); Zhijian Liang, Guangdong (CN); Junxian Liu, Guangdong (CN); Ting Liu, Guangdong (CN)

(73) Assignee: FOSHAN YIXIN STONE CO., LTD, Foshan (CN)

( * ) Notice: Subject to any disclaimer, the term of this patent is extended or adjusted under 35 U.S.C. 154(b) by 0 days.

(21) Appl. No.: 16/600,561

(22) Filed: Oct. 13, 2019

(30) Foreign Application Priority Data

Jul. 8, 2019 (CN) .......................... 2019 1 0607431

(51) Int. Cl.
*C08L 67/07* (2006.01)
*C08K 3/40* (2006.01)
*C08K 3/26* (2006.01)
*C03C 14/00* (2006.01)
*C03C 1/00* (2006.01)

(52) U.S. Cl.
CPC ............ *C03C 14/004* (2013.01); *C03C 1/002* (2013.01); *C03C 2214/04* (2013.01); *C03C 2214/12* (2013.01); *C03C 2214/30* (2013.01)

(58) Field of Classification Search
CPC ... C03C 14/004; C03C 1/002; C03C 2214/04; C03C 2214/12; C03C 2214/30; C08K 3/40; C08K 2003/07; C08L 67/07
See application file for complete search history.

(56) References Cited

FOREIGN PATENT DOCUMENTS

| CN | 107555843 A | 1/2018 |
|---|---|---|
| CN | 108892416 A | 11/2018 |
| CN | 109020302 A | 12/2018 |

OTHER PUBLICATIONS

Machine-generated English-language translation of CN101805500B.*
Machine-generated English-language translation of CN104478292A.*
Ropota et al., International Review of Chemical Engineering, vol. 2, N. 3, May 2010, 430-433.*

* cited by examiner

*Primary Examiner* — Vu A Nguyen

(57) ABSTRACT

A composite plate is mainly made from the following raw materials in percentage by weight: 35% to 45% of calcium carbonate, 45% to 55% of cullet, 5% to 15% of unsaturated polyester resin, 0.1% to 1% of a curing agent, 0.1% to 1% of an auxiliary agent, wherein a ratio of an amount of the calcium carbonate to an amount of the cullet is ≥0.75%. The invention employs cullet, calcium carbonate, and resin as the main raw materials to prepare an artificial stone plate; no natural quartz is used, and hence the raw material cost is low. A reasonable ratio of cullet to calcium carbonate reduces the use of resin, which further reduces the raw material cost. Through a reasonable combination of different raw materials, the composite plate of the invention has physical and chemical properties and decorative abilities that are similar to those of traditional artificial quartz stone.

10 Claims, No Drawings

COMPOSITE PLATE AND PREPARATION METHOD THEREOF

CROSS REFERENCE TO RELATED APPLICATIONS

The present application claims the benefit of Chinese Patent Application No. 201910607431.7 filed on Jul. 8, 2019, the contents of which are incorporated herein by reference in their entirety.

FIELD OF THE INVENTION

The present invention relates to the technical field of construction materials, in particular to a composition plate and a preparation method thereof.

BACKGROUND OF THE INVENTION

With the continuous improvement of living standards, people pursue a higher quality of life, and various artificial stones are being widely used. In terms of preparation methods, existing artificial stones can be divided into three types: a sintered type, a heat-curing type, and a low-temperature curing type. The preparation of the sintered type is similar to the preparation of ceramic bricks, that is, it is obtained by firing at a high temperature; the cost of the stone plates obtained this way is high. The plate obtained by low-temperature curing mainly refers to a plate using cement as the curing agent; such a plate is mostly cured at a low temperature. The heat-curing type mainly refers to a plate obtained by using resin as a binder, mixing quartz, calcium carbonate, talc, feldspar, etc., and curing at 100-300° C. The plates of the heat-curing type are visually appealing and have great decorative abilities. Therefore, existing plates are mostly of the heat-curing type (or resin type).

The most commonly used artificial stone plates are quartz stone plates and artificial granite (calcium carbonate plus resin). Although artificial granite is inexpensive, it has poor chemical resistance, thus its application is limited. On the other hand, the artificial quartz stone has excellent mechanical properties and chemical resistance, thus is widely used. Artificial quartz stones are generally made from quartz stones, resin, a coupling agent, a curing agent and the like of different particle sizes. However, due to the gradual depletion of natural high-quality quartz, some researchers have introduced glass into the formula to replace part of the quartz. For example, Chinese patent CN109020302A discloses a method for producing an artificial stone using resin, glass, quartz, and a pigment. The proportion of glass in the formula is larger than that of quartz. However, due to the amorphous nature of glass, the pulverization of the glass results in a material that has a lot of corners and edges and has a large specific surface area, resulting in poor fluidity, thus more resin is required compared with using quartz. In the aforementioned patent, the amount of resin is 8%-16%, which increases the cost of the artificial stone. The excessively high resin content also reduces the mechanical properties of the artificial stone. Established thinking of the person skilled in the art is that the addition of cullet greatly reduces the fluidity of the slurry, hence the plate is not uniform, its physical and chemical properties are also reduced. Therefore, generally, a small amount of cullet having a small particle size (<400 mesh) is used as a filler, or a small amount of cullet having a large particle size (>30 mesh) is used for decoration. Cullet is rarely used to replace quartz as a construction aggregate (The replacement rate in the prior art is below 50%).

Attempts have also been made to introduce calcium carbonate powder into a quartz stone plate system. For example, Chinese patent CN108892416A discloses a quartz stone plate, which incorporates 10% to 13% of heavy calcium carbonate into its formula. However, heavy calcium carbonate is not hard, thus it reduces the mechanical properties of quartz stone plates. Another example is Chinese patent CN107555843A, which discloses an artificial quartz stone plate prepared using quartz, glass, calcium carbonate, and resin. However, it uses a combination of a variety of resins and the cost is thus high.

Summarizing the aforementioned prior art documents, there are several problems in artificial quartz stones of the prior art: 1. A significant amount resin is used, resulting in poor mechanical properties and high cost. 2. Quartz is used in abundance, resulting in high raw material cost. 3. Too many different types of raw materials give rise to a lot of early-stage processing steps and high manufacturing cost.

SUMMARY OF THE INVENTION

The objective of the present invention is to provide a composite plate which has low raw material cost, low preparation cost, excellent physical and chemical properties, outstanding decorative abilities, and is energy efficient and environmentally friendly.

Another objective of the present invention is to provide a method for preparing the aforementioned composite plate.

To achieve the objective above, the present invention provides a composite plate which is mainly made from the following raw materials in percentage by weight: 35% to 45% of calcium carbonate, 45% to 55% of cullet, 5% to 15% of unsaturated polyester resin, 0.1% to 1% of a curing agent, 0.1% to 1% of an auxiliary agent;
wherein a ratio of an amount of the calcium carbonate to an amount of the cullet is ≥0.75%.

As an improvement to the technical solution above, the composite plate is mainly made from the following raw materials in percentage by weight: 39% to 45% of calcium carbonate, 45% to 53% of cullet, 5% to 9% of unsaturated polyester resin, 0.6% to 1% of a curing agent, 0.5% to 0.9% of an auxiliary agent.

As an improvement to the technical solution above, the composite plate is made from the following raw materials in percentage by weight: 40% of calcium carbonate, 50% of cullet, 8.7% of unsaturated polyester resin, 0.7% of a curing agent, 0.6% of an auxiliary agent.

As an improvement to the technical solution above, the calcium carbonate has a particle size of 280 to 400 mesh; the cullet has a particle size of 40 to 150 mesh.

As an improvement to the technical solution above, the calcium carbonate has a particle size of 300 to 350 mesh; the cullet has a particle size of 40 to 120 mesh.

As an improvement to the technical solution above, the cullet comprises a first cullet and a second cullet, the first cullet has a particle size of 40 to 70 mesh, the second cullet has a particle size of 70 to 120 mesh;
an amount of the first cullet: an amount of the second cullet=(0.5-1.5):(1-2).

As an improvement to the technical solution above, the unsaturated polyester resin is a linear polymer compound having an ester bond and an unsaturated double bond formed by polycondensation of an unsaturated dibasic acid and a diol or polycondensation of a saturated dibasic acid and an unsaturated diol.

As an improvement to the technical solution above, the curing agent is one or more selected from the group consisting of t-butyl peroxy-2-ethylhexanoate, t-butyl peroxybenzoate, and benzoyl peroxide;

the auxiliary agent is one or more selected from the group consisting of a silane coupling agent, an aluminate coupling agent, and a titanate coupling agent.

As an improvement to the technical solution above, the curing agent is t-butyl peroxy-2-ethylhexanoate; the auxiliary agent is γ-methacryloxypropyltrimethoxysilane.

Accordingly, the present invention provides a preparation method of the aforementioned composite plate, wherein it comprises the following steps:

(1) preparing each raw material according to a formula;
(2) mixing various raw materials thoroughly to obtain a base material;
(3) subjecting the base material to vibration pressing to obtain a plate clay body;
(4) heat-curing the plate clay body at 80-120° C. to obtain the composite plate.

The present invention has the following beneficial effects:

1. The invention employs cullet, calcium carbonate, and resin as the main raw materials to prepare an artificial stone plate; no natural quartz is used, and hence the raw material cost is low. A reasonable ratio of cullet to calcium carbonate reduces the use of resin, which further reduces the raw material cost.

2. Through a reasonable combination of different particle sizes of cullet, calcium carbonate, and resin, the composite plate of the present invention has good physical and chemical properties. As a result, the chemical and corrosion resistance and the mechanical properties of the composite plate are similar to those of the artificial quartz stones of the prior art.

3. The invention reduces the vibration frequency of the pressure plate during the vibration pressing process through a combination of different particle sizes of cullet and calcium carbonate. This leads to reduced molding time and increased production efficiency.

DETAILED DESCRIPTION OF THE ILLUSTRATED EMBODIMENTS

To clearly illustrate the objectives, technical solutions and advantageous effects of the present invention, the present invention will be further described below.

A conventional quartz stone plate is made from a large amount of quartz, which leads to high raw material cost. In addition, because natural quartz often contains holes resulted from weathering, a large amount of resin is required, which further increases the raw material cost. Although a small amount of cullet can be used instead of quartz to reduce the amount of quartz, the random-occurring fracture surfaces and a large specific surface area of the cullet require an increased amount of resin, resulting in increased cost. Thus, the present invention provides a composite plate which is mainly made from the following raw materials in percentage by weight: 35% to 45% of calcium carbonate, 45% to 55% of cullet, 5% to 15% of unsaturated polyester resin, 0.1% to 1% of a curing agent, 0.1% to 1% of an auxiliary agent, wherein the ratio of the amount of the calcium carbonate to the amount of the cullet is ≥0.75%. The present invention does not include quartz in its raw materials; instead, cullet is the main construction aggregate, which greatly reduces the cost of raw materials. Besides, by adding calcium carbonate and controlling the ratio of the amount of calcium carbonate to the amount of cullet, the amount of resin is effectively reduced, further reducing raw material cost. In addition, mixing calcium carbonate and cullet gives rise to a higher packing density, which reduces the subsequent vibration pressing time, lowers manufacturing cost, and improves various qualities of the product.

The cullet is obtained by crushing waste glass. The waste glass may be selected from one or more of common soda-lime glass, borate glass, lead silicate glass, and quartz glass. Preferably, common soda-lime glass is used. Soda-lime glass has poor rigidity and requires low energy to crush. After it is crushed, its specific surface area is relatively small, which reduces the amount of resin required and increases the strength of the composite plate. In addition, the replacement of quartz by cullet allows the recycling of waste glass.

45-55 wt % of the cullet is added. When the amount of quartz exceeds 55 wt %, the amount of calcium carbonate decreases, and calcium carbonate is unable to fully provide desirable fluidity. As a result, the clay body of the plate is not homogenous, and its physical and chemical properties are lowered; in addition, the amount of resin used is increased, leading to increased cost. When the amount of quartz is <45 wt %, the amount of calcium carbonate increases, which significantly reduces the mechanical properties and chemical resistance of the composite plate. Preferably, 45-53 wt % of the cullet is added; preferably 50 wt % of the cullet is added.

Further, to balance the raw material cost, the manufacturing cost, and the physical and chemical properties, the present invention controls the particle size of the cullet to be 40 to 150 mesh. The cullet within this particle size range can function as a construction aggregate and can improve the physical and chemical properties of the composite plate. Also, the amount of resin adsorbed by the cullet within this particle size range is small and the fluidity is moderate. In addition, compared with quartz materials, the cullet of such a particle size produces a composite plate that is more transparent, and the effect of pigment and the like is more apparent, which greatly improves the decorative effects of the composite plate.

Preferably, the cullet has a particle size of 40 to 120 mesh. More preferably, the cullet comprises a first cullet and a second cullet. The first cullet has a particle size of 40 to 70 mesh, the second cullet has a particle size of 70 to 120 mesh. The amount of the first cullet: the amount of the second cullet=(0.5-1.5):(1-2); the cullet mixture having this ratio has better fluidity and allows good mechanical properties. More preferably, the amount of the first cullet: the amount of the second cullet=1:1. More preferably, the first cullet has a particle size of 50 mesh, the second cullet has a particle size of 100 mesh, and the amount of the first cullet: the amount of the second cullet=1:1.

Calcium carbonate is heavy calcium carbonate or light calcium carbonate. Alternatively, calcium carbonate is selected from activated calcium carbonate or crystalline calcium carbonate, but is not limited thereto. The amount of resin adsorbed by the calcium carbonate material is small, and can effectively increase the bulk density of the mixed raw materials, improving fluidity.

Calcium carbonate is added in a weight percentage of 35% to 45%, the amount of calcium carbonate: the amount of cullet 0.75. Preferably, calcium carbonate is added in a weight percentage of 39% to 45%, and the amount of calcium carbonate: the amount of cullet is 0.75 to 0.9.

Controlling the amount of calcium carbonate and cullet effectively give rise to better mechanical properties, decorative abilities, and lower raw material costs and manufacturing costs.

Further, in order to fully exert the effects of calcium carbonate, the particle size of the calcium carbonate is 280-400 mesh. It should be noted that in the pressing process, the flow distance of coarse cullet is small, thus it is difficult to homogenize and level. The usual approach is to increase the amount of resin, but the cost is high. The present invention uses a fine calcium carbonate, which can flow and fill during the pressing process, and is able to improve the density and mechanical properties of the composite plate while reducing the amount of the resin. Preferably, the calcium carbonate has a particle size of 300 to 350 mesh.

The unsaturated polyester resin is a linear polymer compound having an ester bond and an unsaturated double bond formed by the polycondensation of an unsaturated dibasic acid and a diol or the polycondensation of a saturated dibasic acid and an unsaturated diol. The curing agent is one or more selected from the group consisting of t-butyl peroxy-2-ethylhexanoate, t-butyl peroxybenzoate, and benzoyl peroxide. The auxiliary agent is one or more selected from the group consisting of a silane coupling agent, an aluminate coupling agent, and a titanate coupling agent.

Preferably, the curing agent is t-butyl peroxy-2-ethylhexanoate, the auxiliary agent is γ-methacryloxypropyltrimethoxysilane.

The unsaturated polyester resin is added in an amount of 5 wt % to 15 wt %, preferably 5 wt % to 9 wt %. The curing agent is added in an amount of 0.1 wt % to 1 wt %, preferably 0.6 wt % to 1 wt %. The auxiliary agent is added in an amount of 0.1 wt % to 1 wt %, preferably 0.5 wt % to 0.9 wt %.

Further, the raw material of the composite plate of the present invention comprises a pigment. The pigment may be selected from one or two kinds of an inorganic pigment and an organic pigment. The pigment is 0% to 2% of the total raw material weight.

Accordingly, the present invention also discloses a method for preparing the aforementioned composite plate, which comprises the following steps:

I. Preparing Each Raw Material According to a Formula.

Specifically, each raw material is prepared according to a formula, and the raw materials are pre-processed so that their particle sizes are within the range required by the present invention.

II. Mixing the Various Raw Materials Thoroughly to Obtain a Base Material.

Specifically, first, a resin, a curing agent, and an auxiliary agent are thoroughly mixed to obtain a slurry; then, cullet and calcium carbonate are added to the slurry, and the mixture is thoroughly mixed to obtain the base material.

Preferably, the method further comprises mixing a part of the resin with a pigment to obtain a decorative material.

III. Subjecting the base material to vibration pressing to obtain a plate clay body.

Specifically, the method comprises uniformly distributing the base material on a mold to obtain stacked powder; filling the decorative material into the stacked powder according to a predetermined pattern; and then performing vibration pressing to obtain the plate clay body; or mixing the base material and decorative material to obtain a mixture; distributing the mixture on a mold; performing vibration pressing to obtain the plate clay body.

The frequency of vibration pressing is 30 Hz to 60 Hz and the vibration pressing time is 2 min to 5 min. Preferably, the frequency of vibration pressing is 30 Hz to 50 Hz, the vibration pressing time is 1 min to 3 min. The invention increases the bulk density and fluidity of the mixture through its composition, which leads to shortened pressing time and increased production efficiency.

IV. Heat-Curing the Plate Clay Body at 80-120° C. to Obtain the Composite Plate.

The preparation method further comprises processes of thickness gauging, polishing, and cutting of the composite plate.

The invention will now be described with reference to specific embodiments.

Embodiment 1

This embodiment provides a composite plate prepared from the following formula:

45% cullet, 38% calcium carbonate, 15% unsaturated polyester resin, 1% curing agent, 1% auxiliary agent;

wherein the curing agent is t-butyl peroxybenzoate and the auxiliary agent is a titanate coupling agent.

The cullet has a particle size ranging from 130 to 150 mesh, the calcium carbonate has a particle size ranging from 280 to 300 mesh.

Preparation:

(1) Each raw material was prepared according to the formula.

(2) Various raw materials were mixed uniformly to obtain a base material.

(3) The base material was subjected to vibration pressing to obtain a plate clay body, wherein the vibration pressing frequency was 30 Hz, the time was 5 min.

(4) The plate clay body was heat-cured at 80° C. to obtain the composite plate product.

Embodiment 2

This embodiment provides a composite plate prepared from the following formula:

49.8% cullet, 45% calcium carbonate, 5% unsaturated polyester resin, 0.1% curing agent, 0.1% auxiliary agent;

wherein the curing agent is benzoyl peroxide and the auxiliary agent is an aluminate coupling agent.

The cullet has a particle size ranging from 40 to 50 mesh, the calcium carbonate has a particle size ranging from 380 to 400 mesh.

Preparation:

(1) Each raw material was prepared according to the formula.

(2) Various raw materials were mixed uniformly to obtain a base material.

(3) The base material was subjected to vibration pressing to obtain a plate clay body, wherein the vibration pressing frequency was 40 Hz, the time was 2 min.

(4) The plate clay body was heat-cured at 90° C. to obtain the composite plate product.

Embodiment 3

This embodiment provides a composite plate prepared from the following formula:

51% cullet, 41.8% calcium carbonate, 6% unsaturated polyester resin, 0.7% curing agent, 0.5% auxiliary agent;

wherein the curing agent is t-butyl peroxy-2-ethylhexanoate and the auxiliary agent is γ-methacryloxypropyltrimethoxysilane.

The cullet has a particle size ranging from 100 to 120 mesh, the calcium carbonate has a particle size ranging from 300 to 320 mesh.

Preparation:

(1) Each raw material was prepared according to the formula.

(2) Various raw materials were mixed uniformly to obtain a base material.

(3) The base material was subjected to vibration pressing to obtain a plate clay body, wherein the vibration pressing frequency was 45 Hz, the time was 2 min.

(4) The plate clay body was heat-cured at 90° C. to obtain the composite plate product.

Embodiment 4

This embodiment provides a composite plate prepared from the following formula:

50% cullet, 43.2% calcium carbonate, 5.1% unsaturated polyester resin, 0.8% curing agent, 0.9% auxiliary agent;

wherein the curing agent is t-butyl peroxy-2-ethylhexanoate and the auxiliary agent is γ-methacryloxypropyltrimethoxysilane.

The cullet has a particle size ranging from 40 to 60 mesh, the calcium carbonate has a particle size ranging from 320 to 350 mesh.

Preparation:

(1) Each raw material was prepared according to the formula.

(2) Various raw materials were mixed uniformly to obtain a base material.

(3) The base material was subjected to vibration pressing to obtain a plate clay body, wherein the vibration pressing frequency was 45 Hz, the time was 2 min.

(4) The plate clay body was heat-cured at 90° C. to obtain the composite plate product.

Embodiment 5

This embodiment provides a composite plate prepared from the following formula:

50% cullet, 40% calcium carbonate, 8.7% unsaturated polyester resin, 0.7% curing agent, 0.6% auxiliary agent;

wherein the curing agent is t-butyl peroxy-2-ethylhexanoate and the auxiliary agent is γ-methacryloxypropyltrimethoxysilane.

The cullet has a particle size ranging from 40 to 60 mesh, the calcium carbonate has a particle size ranging from 320 to 350 mesh.

The preparation method is the same as that of embodiment 4.

Embodiment 6

This embodiment provides a composite plate prepared from the same formula as that of embodiment 4 via a method that is the same as that of embodiment 4.

The main differences are that the cullet includes 25% of a first cullet and 25% of a second cullet. The particle size of the first cullet is 40-60 mesh, the particle size of the second cullet is 80-100 mesh.

The particle size of calcium carbonate is 340-350 mesh.

Comparative Embodiment 1

This embodiment provides an artificial quartz stone prepared from the following formula:

62.6% cullet, 20% quartz, 17% resin, 0.2% curing agent, 0.2% auxiliary agent;

wherein the cullet includes 15% of a first cullet, 25% of a second cullet, and 22.6% of a third cullet. The first cullet has a particle size of 1-10 mesh; the second cullet has a particle size of 325-600 mesh; the third cullet has a particle size of 40-120 mesh. The particle size of quartz is 40-120 mesh.

Preparation:

(1) Each raw material was prepared according to the formula.

(2) Various raw materials were mixed uniformly to obtain a base material.

(3) The base material was subjected to vibration pressing to obtain a plate clay body, wherein the vibration pressing frequency was 45 Hz, the time was 4 min.

(4) The plate clay body was heat-cured at 92° C. to obtain the artificial quartz stone product.

Comparative Embodiment 2

This embodiment provides an artificial quartz stone prepared from the following formula:

71.5% quartz, 15% calcium carbonate, 9% unsaturated polyester resin, 2.5% curing agent, 2% coupling agent (an auxiliary agent);

wherein the quartz includes 45% of a first quartz and 16.5% of a second quartz. The first quartz has a particle size of 60-100 mesh; the second quartz has a particle size of 280-300 mesh.

Embodiments 1-6 and comparative embodiments 1-2 were tested according to the method specified in Chinese standard JC/T908-2013, the results are as follows.

| | Bending strength/ MPa | Compression strength MPa | Gloss | Total stain resistance | Chemical resistant | Appearance |
|---|---|---|---|---|---|---|
| Embodiment 1 | 44.3 | 188 | 43 | 55 | Resistant | Uniform color, smooth |
| Embodiment 2 | 45.8 | 184.4 | 42 | 54 | Resistant | Uniform color, smooth |
| Embodiment 3 | 45.7 | 198 | 43 | 54 | Resistant | Uniform color, smooth |
| Embodiment 4 | 47.3 | 196 | 42 | 56 | Resistant | Uniform color, smooth |
| Embodiment 5 | 49 | 200 | 44 | 55 | Resistant | Uniform color, smooth |
| Embodiment 6 | 50.6 | 208 | 46 | 58 | Resistant | Uniform color, smooth |
| Comparative Embodiment 1 | 52.4 | 216 | 38 | 56 | Resistant | Uniform color, smooth |
| Comparative Embodiment 2 | 45.2 | 176 | 33 | 56 | Resistant | Uniform color, smooth |

The above are only the preferred embodiments of the present invention, and the scope of the present invention is not limited thereto. Improvements and modifications made according to the claims of the present invention are still within the scope of the present invention.

What is claimed is:

1. A composite plate, wherein it is mainly made from the following raw materials in percentage by weight: 35% to 45% of calcium carbonate, 45% to 55% of cullet, 5% to 15% of unsaturated polyester resin, 0.1% to 1% of a curing agent, and 0.1% to 1% of an auxiliary agent, wherein a ratio of the amount of the calcium carbonate to the amount of the cullet is ≥0.75%.

2. The composite plate according to claim 1, wherein it is mainly made from the following raw materials in percentage by weight: 39% to 45% of calcium carbonate, 45% to 53% of cullet, 5% to 9% of unsaturated polyester resin, 0.6% to 1% of a curing agent, and 0.5% to 0.9% of an auxiliary agent.

3. The composite plate according to claim 2, wherein it is made from the following raw materials in percentage by weight: 40% of calcium carbonate, 50% of cullet, 8.7% of unsaturated polyester resin, 0.7% of a curing agent, and 0.6% of an auxiliary agent.

4. The composite plate according to claim 1, wherein the calcium carbonate has a particle size of 280 to 400 mesh; and the cullet has a particle size of 40 to 150 mesh.

5. The composite plate according to claim 4, wherein the calcium carbonate has a particle size of 300 to 350 mesh; and the cullet has a particle size of 40 to 120 mesh.

6. The composite plate according to claim 5, wherein the cullet comprises a first cullet and a second cullet, the first cullet has a particle size of 40 to 70 mesh, the second cullet has a particle size of 70 to 120 mesh; and a ratio of the amount of the first cullet to the amount of the second cullet is (0.5-1.5):(1-2).

7. The composite plate according to claim 1, wherein the unsaturated polyester resin is a linear polymer compound having an ester bond and an unsaturated double bond formed by polycondensation of an unsaturated dibasic acid and a diol or polycondensation of a saturated dibasic acid and an unsaturated diol.

8. The composite plate according to claim 1, wherein the curing agent is one or more selected from the group consisting of t-butyl peroxy-2-ethylhexanoate, t-butyl peroxybenzoate, and benzoyl peroxide; and the auxiliary agent is one or more selected from the group consisting of a silane coupling agent, an aluminate coupling agent, and a titanate coupling agent.

9. The composite plate according to claim 8, wherein the curing agent is t-butyl peroxy-2-ethylhexanoate; and the auxiliary agent is γ-methacryloxypropyltrimethoxysilane.

10. A preparation method of the composite plate according to claim 1, wherein it comprises the following steps:
(1) preparing each raw material according to a formula;
(2) mixing various raw materials thoroughly to obtain a base material;
(3) subjecting the base material to vibration pressing to obtain a plate clay body; and
(4) heat-curing the plate clay body at 80-120° C. to obtain the composite plate.

* * * * *